Sept. 12, 1967            E. M. IVERSON            3,341,396
MARBLEIZING PROCESS AND ARTICLE
Filed Jan. 5, 1967
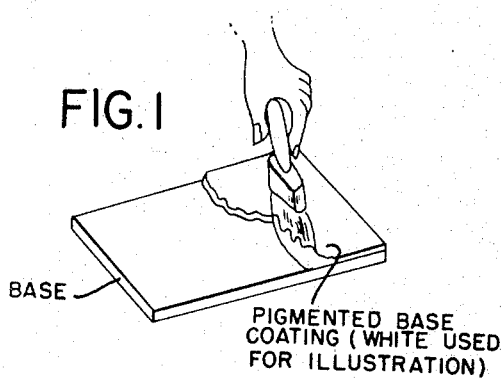
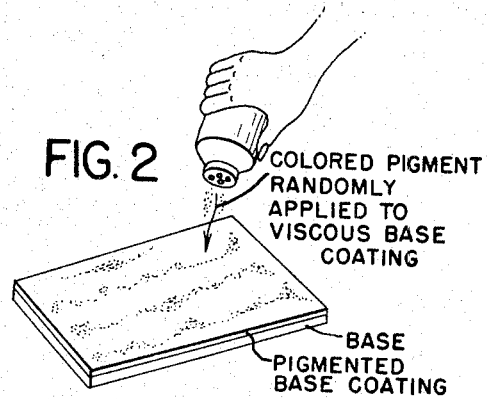
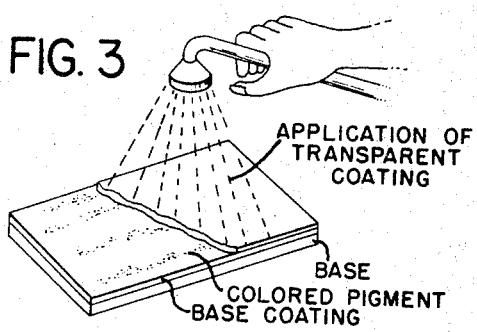
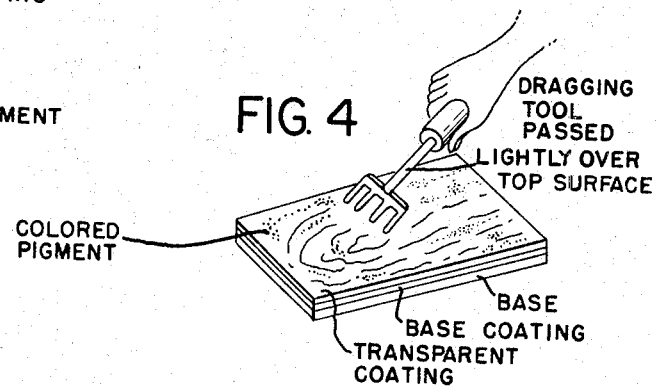
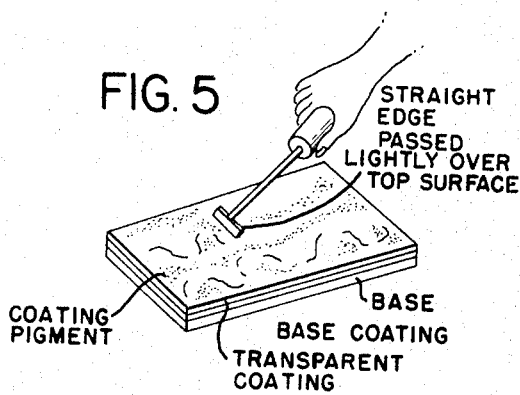
INVENTOR.
ELIZABETH M. IVERSON
BY Gene O. Enochson
ATTORNEY

United States Patent Office 3,341,396
Patented Sept. 12, 1967

3,341,396
MARBLEIZING PROCESS AND ARTICLE
Elizabeth M. Iverson, Wayzata, Minn., assignor to General Mills, Inc., a corporation of Delaware
Filed Jan. 5, 1967, Ser. No. 607,537
11 Claims. (Cl. 161—162)

ABSTRACT OF THE DISCLOSURE

A process for producing a decorative coating and the resulting articles. A pigmented base layer of a curable synthetic resinous liquid coating material is applied to a surface, at least one color pigment of a different color is applied in a random discontinuous pattern overlying the base layer, a substantially transparent layer of the curable synthetic resinous liquid coating material is applied and, before the coating layers have set, the surface of the transparent top layer is acted upon to initiate surface movement only to induce by wave motion subsurface flow and diffusion of the pigmented intermediate layer.

This application is a continuation-in-part of my copending application Ser. No. 309,626, filed Sept. 18, 1963, now abandoned. The latter application is a continuation-in-part of its copending application Ser. No. 778,082, filed Dec. 4, 1958, and now abandoned.

This invention relates to a new and improved process for the production of synthetic coatings in simulation of marble and like natural stone substances, and to the resulting product. More particularly, this invention relates to a method for making a hard, durable, realistic-appearing marbleized coating which is resistant to the effects of scuffing, abrasion, heat and most common stains, acids and solvents.

The process of this invention is useful for the production of decorative and ornamental protective coatings in simulation of variegated marbles, agates, onyx, Mexican onyx, banded alabaster and the like wherein variegated colors are arranged in veins, stripes or bands or blended in clouds or showing moss-like forms and variations thereof, such as commonly appear in nature. The marbleized products according to this invention may be produced on a wide variety of bases including woods; plasterboards; beaver-boards; pressed woods, such as those sold under the trademarks "Masonite" and "Timblend"; various pressed fiber boards; cardboard; paper; textile fabrics, plastic sheets; fiberglass; cement blocks; bricks; straw mat; insulating batts and the like; or as a self-sustaining sheet.

The marbleized products are useful for the production of walls; floors; architectural facings; fireplaces; tops for tables, counters, vanities, desks and the like; in tile form for all purposes for which marble, ceramic and plastic tile is used; bases for lamps, desk sets, sculpture and the like; and in general, for all of those purposes for which natural marble and like natural stone materials are used. The marbleized finish produced according to this invention is superior to the finish of natural marble in many respects in that it is substantially non-porous and, therefore, non-absorbent and its surface cannot be penetrated by water, grease, cigarette stains, and the like.

In general, the marbleizing process for producing marbleized finishes according to this invention may be carried out using any curable synthetic resinous liquid coating material. The resinous material may be self curable at ambient temperatures. However, the curing may be accelerated by application of heat and/or the addition of a catalyst. The resinous material may also comprise two or more components, at least one of which acts as a curing or cross-linking agent. Preferred coating materials are the polyester resin-based protective coating compositions. Suitable polyesters are the polymerizable unsaturated polyesters such as those prepared from ethylenically unsaturated polycarboxylic acids and polyhydric alcohols. Such coating materials may also contain a copolymerizable ethylenically unsaturated compound such as styrene. Exemplary polyester resin-based protective coating materials are disclosed in the commonly assigned application of Robert P. Arens entitled "Coating Composition," Ser. No. 768,043, filed Oct. 20, 1958, and now abandoned. Other coating materials may also be used. Examples of such materials are the epoxy resins.

The marbleizing process is carried out by first applying to a suitable support a base coating layer pigmented to have the desired background color. This initial background color layer may be applied by hand or mechanically by any of a number of conventional coating application means including spraying, rolling, brushing, fountain applicator, and the like. The base layer should be relatively thick and smooth and uniform. While the base layer is still viscous and liquid before it has set up and hardened, the marbleizing color pigment is applied. The color pigment is an inert inorganic finely divided substance applied either as a dry powder or in paste form. One or more pigment colors are applied which are complementary to or in contrast with the background color of the base coat as dictated by the natural stone material whose appearance is desired to be simulated. The color pigment is applied by hand or by a suitable dispensing machine in a random pattern preferably extending longitudinally of the base surface in simulation of the veins indicating separate strata as encountered in natural formations.

The marbleizing color pigment is applied non-uniformly and discontinuously so as to cover only a fraction of the background color coating. The marbleizing pigment is added in relatively thicker and heavier amounts at some areas of the base surface coating and relatively lighter amounts at others. Whether applied as a paste or dry powder, the marbleizing color pigment tends to sink to some extent into the base background color layer and the marbleizing colors diffuse into the base layer. Where heavier applications of color pigment are made, the pigment tends to disperse deeper into the base layer than where a lighter application of color pigment is made. When the marbleizing color pigments are added in paste form, that paste is made up of a dispersion of the inorganic finely divided pigment suspended in the resin of the coating layers to produce a moderately viscous liquid.

In order to impart a three-dimensional quality to the ultimate marbleized finish, a layer of transparent unpigmented coating composition comprised of the same resin base as the background coating layer is applied on top of the marbleizing color pigment before the base layer has set up and hardened. The transparent top layer may be applied by spraying, rolling, from a fountain or the like, but should be applied so as to effect minimum disturbance of the underlying discontinuous color pigment layer and background color layer. Thereafter, before the several layers have set up and hardened, the top surface is "dragged" by passing a doctor blade, graining tool or similar device over the still liquid surface. The blade or tool may be formed of metal, wood, rigid or flexible synthetic resin or the like and it may be a straight edge or it may be provided with notches or other open spaces to form a discontinuous edge.

The dragging tool is passed over the surface in a generally longitudinal direction with the tool disposed transversely of the work surface. The dragging tool is passed lightly over the surface so as to produce minimum disturbance of the top surface layer, but at the same time to effect some disturbance and movement of the underlying pigmented layers, as in the nature of a wave motion initiated at the surface. The top surface is dragged in a generally longitudinal direction with respect to the work piece, but at the same time desirably wtih a slight irregular movement to impart the appearance of imperfections and irregularities in vein structure such as are found in natural formations.

Referring to the drawings: FIG. 1 illustrates the application of the pigmented base coating to the base surface; FIG. 2 illustrates the application of the marbleizing color pigment in a random discontinuous pattern overlying the base coating layer; FIG. 3 illustrates the application of the transparent coating on top of the marbleizing color pigment and base coating layer; FIG. 4 illustrates acting upon the surface of the transparent top coating layer with a notched dragging tool to initiate surface movement; and FIG. 5 illustrates acting upon the surface of the transparent top coating layer with a straight edged scrapping blade to initiate surface movement.

The underlying pigmented zones containing the diffused color pigments tend to flow under influence of the dragging tool even though insulated by much of the thickness of the surface layer from actual contact with that tool. The same effect can be achieved by directing jets of gas under pressure against the topmost transparent layer before the composite coating has had time to set up. Thereafter, the marbleized finish is permitted to set up and harden in air or in a baking or drying oven or, in the case of certain air-inhibited coating resins, the coating may be cured while sealed from contact with air as explained in greater detail hereinafter. After the surface has hardened, it can be sanded to give it a smooth surface and then buffed to a high polish. The air-inhibited coatings which are permitted to set up in contact with a smooth polished surface require no sanding or polishing. When a self-sustaining film or sheet is to be formed the base layer is applied to a surface from which the composite coating may be stripped after it is set up. Such surfaces include polished metal, cellophane, Mylar (Du Pont's polyethylene terephthalate film), waxed and greased surfaces and the like.

Each of the coating layers is preferably composed of a two-component resinous coating material including a base resin portion and a curing agent or catalyst portion. In general, when a catalyst is used, each layer is catalyzed before application to the work surface. After the catalyst component is incorporated into the base resin, the composite coating begins to set up almost immediately but usually requires a period of from a few minutes to several hours to set up completely and harden. For this reason, it is imperative that the catalyzed coating material be used shortly after the catalyst is added to the base resin. It has been discovered, however, that if the composite coating material containing both base resin and catalyst is kept cold until appplication, the materials may be prepared somewhat prior to use. Alternatively, instead of admixing the base resin portion of the coating and the catalyst component prior to application, the base resin coating may be initially applied and thereafter, when each of the several layers has been applied, they may be catalyzed simultaneously by exposure to the catalyst in vapor form.

The marbleizing coating is preferably applied to a flat horizontal work piece. This is because the marbleizing color pigments diffuse and seek their own level within the coating layers under influence of gravity. The application of the marbleizing coating of this invention is not limited to horizontal surfaces, however, but may be applied to cylindrical bases and other surfaces having a generally circular cross section by mounting the work piece so that it can be slowly rotated about its longitudinal axis in a horizontal plane at a slow rate just sufficient to prevent sagging and running of the coating material. To assist in the application of marbleized coatings to such rotating surfaces, it is desirable to use coating materials having thixotropic properties. The veining and striations may be formed either longitudinally or circumferentially with respect to the rotating base. Where the striations are formed to run generally longitudinally, they are formed on opposite sides of the base in simulation of natural formations in which the strata lie generally in planes and extend through from one side to the other of the work piece. Illustrative of this, one may consider a sphere turned from veined marble. When viewed from one side, the veins will appear generally as a series of lines whereas when viewed from another side at a right angle to the first, the veins appear as a series of generally concentric circular lines. The same effect can be simulated by the process of this invention.

For many purposes it is desirable to coat all of the surfaces of the workpiece being coated. For example, architectural panels, tiles, etc., are preferably given a seal coat on the back and all edge surfaces. This seal coat need be marbleized only if it is to be visible but, more often is the same as the base layer coating. Panels and tiles for outdoor use are preferably kiln dried.

The invention is further illustrated by the following examples:

*Example I*

A veined white marbleized surface coating is prepared by admixing 100 parts of a medium reactivity thermo-setting unsaturated polyester resin, 73 parts styrene, 0.37 part cobalt naphthenate accelerator, 0.63 part ultraviolet absorber and 4.5 parts propyl formate. This base resin mixture is catalyzed by the admixture of 8 parts by weight of a catalyst solution comprised of 100 parts by weight of methyl ethyl ketone peroxide (60% solution in dimethyl phthalate) and 3 parts peroxyacetic acid (30% solution in dimethyl phthalate). The resulting mixture is essentially clear and transparent in thin layers. It is divided into approximately equal portions and one portion is pigmented by the addition of 3 parts by weight of a white (anatase) titanium dioxide pigment. The pigmented mixture is then poured and spread evenly over a slab of "Timblend" pressed wood fiber board supported so as to be horizontal and substantially level.

The pigmented base resin is spread evenly over the pressed wood board. Two separate smaller batches of pigmented base resin of the same composition are made up. One is a thin paste of black finely divided inorganic pigment and the other is gray. This pigmented paste is then applied to the still liquid unset white background coating layer in an irregular discontinuous pattern. In general the black and gray pigments are applied in generally longitudinal narrow streaks although in some areas, irregular blobs and swirls of these pigments, either separately or intermingled, are applied to the white base coating layer. The overall appearance at this stage is singularly unattractive. Then, while the base layer and marbleizing pigments pastes are still unset, the remaining clear base resin is spread uniformly over the underlying layers.

After application of the clear surface layer, the surface is "dragged" by passing a flexible metal scraping blade longitudinally generally in the direction of the pattern of the intermediate marbleizing pigment layer. The scraper blade is passed lightly over the unset surface of the transparent top coating. No attempt is made to penetrate the top coating layer and act directly upon the pigmented intermediate layer to mix the pigments. Instead a wave motion is applied through the unset coating material which acts upon the discontinuous intermediate layer and causes the marbleizing pigments to flow beneath the surface of the top layer. At the same time the marbleizing pigments tend to migrate vertically downwardly into the background layer and upwardly into the transparent over layer. The marbleizing pigments tend to seek their own level. The heavier and larger agglomerated masses tend to sink and diffuse into the background layer and lighter finer masses tend to rise to some extent and diffuse into the transparent covering layer. The result is a three dimensional effect in simulation of the depth of strata present and visible in natural marble and like materials and the product at this stage assumes the appearance of natural marble.

Because the polyester composition comprising the base resin is of the air-inhibited type, it is necessary to exclude air in order that the coating layers will set up and harden. A sheet of cellophane film is then applied over the transparent cover layer while it is still unset and is gently smoothed with a roller or the like into intimate contact with the top surface of the transparent layer and to remove any entrapped air which might be present. After several hours the cellophane film is stripped off and the composite marbleized coating has become set and hardened. Its surface mirrors the smooth glossy surface of the cellophane film so that no buffing or polishing is required. The resultant product closely resembles natural white marble having black and gray veining.

*Example II*

A further simulated marble slab is produced by making up an uncatalyzed base resin mixture containing 100 parts of polyester resin, 59.6 parts styrene monomer and 0.37 part cobalt naphthenate accelerator and dividing into two portions, one of which is pigmented with an inorganic pigment of appropriate color and applied to a panel of Masonite supported so as to be horizontal and level. Pigment paste of three different colors are made up in the same uncatalyzed base resin and these colors are applied in a random discontinuous pattern over the surface of the base coating. The remainder of the uncatalyzed base resin is applied as a transparent top layer and the surface of this layer is dragged with a metal doctor blade to cause flow and diffusion of the underlying pigments. The entire panel is then placed in a closed chamber where it is exposed to catalyzing vapors formed by vaporizing a solution of 100 parts methyl ethyl ketone peroxide containing three parts peroxyacetic acid and set up and hardened.

*Example III*

An epoxy resin marbleized surface coating is produced by the use of a commercial reactive type amine cured epoxy resin marketed in a two-package system along with its curing agent. The curing agent and resin are admixed and divided into two portions, one of which is pigmented with the desired background color and applied to a preformed concrete slab. Commercial paste colors (Ferro) compounded in an epoxy resin as the liquid medium are applied in the random discontinuous variegated color pattern as in the other examples. The remaining catalyzed epoxy resin is then applied uniformly over the marbleizing pigment layer and before any of the several layers are permitted to set up and harden, the surface is dragged with a thin wooden blade. The pigment colors underlying the surface layer flow and diffuse and produce the simulated marble pattern. The marbleizing epoxy coating is permitted to set up and harden in air. It is then buffed and polished and the resulting coating slab is generally comparable to a marble building block but is superior in some respects in that the surface is non-porous and more resistant to stain and wear than is natural marble.

*Example IV*

A self-sustaining flexible marbleized film is produced by applying the catalyzed flexible coating composition of Example II upon a horizontal panel over which a film of "Mylar" (Du Pont's polyethylene terephthalate film) has been smoothly stretched. The base background coating, marbleizing pigments and transparent cover layer are applied in the manner described. The surface of the cover layer is dragged with a wooden blade and the marbleized coating is permitted to set up and harden in air. The surface is buffed and polished. Then the composite coating is stripped from the base. The resulting marbleized film is flexible and may be easily cut and bent for application by adhesive to irregular and curved surfaces.

The above examples illustrate but a few of the many variations in materials and methods of application and treatment which are useful in carrying out the present invention. Since natural marbles, alabaster, onyx and like decorative stone materials appear in almost infinite variety of colors and patterns, the invention is unlimited by either the colors which are employed or the patterns in which they are arrayed. The marbleizing pigments can be applied individually or they can be admixed to some extent and applied together as a heterogeneous mixture. Bits of mica can be scattered at random over the surface prior to application of the finishing transparent cover coat in simulation of the micaceous substances which are often found in nature.

The polyester compositions of Examples I, II and IV may be catalyzed with benzoyl peroxide in either crystal or solution form as well as with other of the soluble organic peroxide catalysts. Those catalysts which are relatively slow acting and produce compositions having relatively long pot lives can be incorporated to catalyze the resin in advance of use whereas the catalyzed resins with short pot lives must not be catalyzed until just prior to use.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method of producing a marbleized surface coating in simulation of natural marble and the like which comprises applying to a surface a pigmented base layer of a curable synthetic resinous liquid coating material; before the base layer has set up, applying on top of the base layer at least one color pigment of a color different from the color of the base layer arranged in a random discontinuous pattern overlying the base layer; before the underlying layers have set up, applying a substantially transparent coating of the same curable synthetic resinous coating material as the pigmented base layer; before the coating layers have set, acting upon the surface of the transparent top layer to initiate surface movement only to induce by wave motion sub-surface flow and diffusion of the pigmented intermediate layer; and, thereafter, permitting the composite coating to set up and harden.

2. A method of marbleizing according to claim 1 further characterized in that said pigments are inert finely divided inorganic coloring substances.

3. A method of marbleizing according to claim 1 further characterized in that said intermediate discontinuous layer is applied as a thin paste dispersion of the pigment in the same curable synthetic resinous coating material as the base and cover layers.

4. A method of marbleizing according to claim 1 further characterized in that each of the curable synthetic resinous coating layers is catalyzed prior to application to the base surface.

5. A method of marbleizing according to claim 1 further characterized in that said base surface is substantially flat and disposed horizontally.

6. A method of marbleizing according to claim 5 further characterized in that the surface of the top unset coating layer is acted upon by a straight edge in superficial contact with said coating layer.

7. A method of marbleizing according to claim 6 further characterized in that said discontinuous pigment coating layer is appled over said base layer in a random pattern extending generally longitudinally of said base surface, said straight edge is disposed transversely with respect to said base surface and said surface action is initiated by moving said edge irregularly in a generally longitudinal direction with respect to said base surface in simulation of the veining of natural marble.

8. A method of marbleizing according to claim 1 further characterized in that said curable resinous coating material is an unsaturated polyester resin.

9. A method of marbleizing according to claim 1 further characterized in that said coating is applied to a surface having a smooth non-adhering surface and after setting up and hardening the coating is stripped from said base.

10. As a new article of manufacture, the marbleized coated product produced by the method of claim 1.

11. As a new article of manufacture, the marbleized self-sustaining film product produced by the method of claim 9.

References Cited

UNITED STATES PATENTS

| 835,213 | 11/1906 | Bösken | 117—45 |
| 1,413,429 | 4/1922 | Robson | 117—45 |

ALFRED L. LEAVITT, *Primary Examiner.*

A. GRIMALDI, *Assistant Examiner.*